United States Patent [19]

Taylor

[11] 4,092,862

[45] June 6, 1978

[54] THERMAL GRADIENT TEMPERATURE SENSOR

[75] Inventor: Allen L. Taylor, Woodbury, Minn.

[73] Assignee: Minnesota Mining and Manufacturing, St. Paul, Minn.

[21] Appl. No.: 689,133

[22] Filed: May 24, 1976

Related U.S. Application Data

[63] Continuation of Ser. No. 467,015, May 4, 1976, abandoned.

[51] Int. Cl.² .............................................. G01B 7/16
[52] U.S. Cl. ............................................... 73/362 CP
[58] Field of Search ............... 73/339 R, 356, 362 SC, 73/362.8, 355 R, 362 CP, 359 A; 250/331; 317/247, 262 F; 361/233

[56] References Cited

U.S. PATENT DOCUMENTS

| 2,701,964 | 2/1955 | Argabrite | 73/355 R X |
|---|---|---|---|
| 3,448,348 | 6/1969 | Stadler | 317/262 F |
| 3,453,432 | 7/1969 | McHenry | 73/355 R |
| 3,480,777 | 11/1969 | Astheimer | 317/247 |
| 3,713,822 | 1/1973 | Kiess | 96/1.5 |
| 3,765,243 | 10/1973 | Pickett et al. | 73/356 |
| 3,821,895 | 7/1974 | Sumikawa et al. | 73/355 R |
| 3,827,905 | 8/1974 | Roth | 317/262 F X |

*Primary Examiner*—Harry N. Haroian
*Attorney, Agent, or Firm*—Cruzan Alexander; Donald M. Sell; Walter N. Kirn

[57] ABSTRACT

A temperature sensor and method for producing a remanent electrostatic image of a thermal gradient existing on the surface of an object are disclosed. The sensor includes a layer of poled, pyroelectric material that is employed as a medium on which the thermal gradient image is electrostatically formed, with such pyroelectric layer coated on one side with a thermally and electrically conductive layer. The sensor is positioned for a time with its conductive layer in surface-to-surface contact with the object to permit the temperature of the pyroelectric layer to conform to the thermal gradient of the surface of the object contacted by the sensor. Subsequently, both planar surfaces of the pyroelectric layer are electrically neutralized and the sensor is then removed from the object. As the pyroelectric layer returns to the ambient temperature, an electrostatic image representative of the thermal gradient of the object is formed on the uncoated surface of the pyroelectric layer.

10 Claims, 4 Drawing Figures

THERMAL GRADIENT TEMPERATURE SENSOR

This is a continuation of application Ser. No. 467,015, filed May 4, 1976, now abandoned.

BACKGROUND OF THE INVENTION

1. Field of the Invention

The present invention relates in general to a temperature sensor and a method for providing a condition representative of the profile of the thermal gradient of an object, and more specifically resides in the utilization of a poled, pyroelectric layer as a temperature sensitive element of such a sensor.

2. Description of the Prior Art

It is well known that temperature differentials over the exterior surface area of an object may indicate an existing or developing malfunction. For example, a defect in a motor may be evidenced by abnormal localized heating of the motor housing in the vicinity of the defect. Also, carcinogenic tissue in a human body is evidenced by a higher temperature than normal healthy tissue. One prior art sensor for detecting such temperature variations and for providing a temperature pattern thereof is disclosed in a U.S. Pat. No. to Fergason et al, 3,114,836. The Fergason et al sensor employs the use of a liquid crystal temperature sensitive material that selectively scatters light rays to present a color indication of the thermal profile of an object with which it is in contact. However, the profile provided is not a remanent profile and upon removal of the Fergason et al sensor from contact with the object the color of the sensor will disappear as the sensor returns to the ambient temperature.

SUMMARY OF THE INVENTION

The present invention provides a sensor for electrostatically producing a surface temperature profile of the thermal gradient of an object, and includes a layer of thermally sensitive, poled pyroelectric material and a thermally and electrically conductive layer coated on one side of the pyroelectric layer. The sensor is adapted to be attached to the exterior surface of an object whereby the pyroelectric layer produces electrostatic charges of opposite polarities on its planar surfaces in accordance with the thermal gradient of the object.

In a preferred embodiment the pyroelectric layer of the sensor is a single, thin sheet of pyroelectric material providing a sensor that is relatively thin. This allows the sensor to conform to the surface of the object on which it is placed and allows the sensor to adopt the thermal gradient of such object without acting as a heat sink to appreciably vary the temperature of the object. To insure a highly accurate and precise thermal gradient of the object, the pyroelectric layer can also be formed of two pyroelectric sheets held together in surface-to-surface contact by a bonding layer. This provides an embodiment that is not responsive to spurious piezoelectric charges produced by bending. As a result of such piezoelectric compensation, the sensor may be employed on objects having sharply irregular surfaces.

The present invention further includes a method for employing the above described temperature sensor to provide a remanent image of the thermal gradient of the object on which the sensor is placed. Subsequent to placement of the sensor on the object, the sensor conforms to the thermal gradient thereof causing an electrostatic charge pattern to be produced on the uncoated surface of the sensor pyroelectric layer in accordance with the sensed thermal gradient of the object. Before removing the sensor from the object, a visual image of the thermal gradient of the object may then be produced by neutralizing the coated surface of the sensor and powdering the uncoated surface of the sensor with an electrostatic toner powder. Such image may then be permanently transferred. If it is desired to remove the sensor from the object before developing the electrostatic image this may be accomplished by first neutralizing both surfaces of the pyroelectric layer. The sensor may then be removed from contact with the object, and an electrostatic charge pattern opposite to the first pattern results, which pattern may be developed as described above. Thus, the present invention provides a relatively simplistic and inexpensive means and method for producing a remanent thermal gradient of an object through pyroelectrically produced electrostatic charges.

The foregoing and other advantages of the present invention will appear from the following description. In the description reference is made to the accompanying drawings, which form a part hereof, and in which there is shown by way of illustration, and not of limitation, specific forms in which the invention may be embodied. Such embodiments do not represent the full scope of the invention, but rather the invention may be employed in a variety of embodiments, and reference is made to the claims herein for interpreting the breadth of the invention.

DESCRIPTION OF THE PREFERRED EMBODIMENTS

Figure 1:
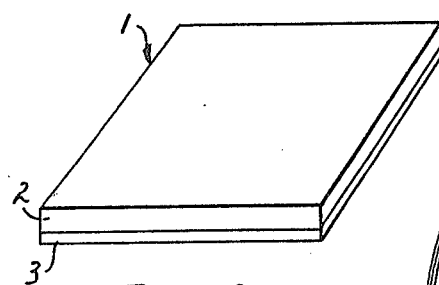
FIG. 1 is a perspective view of a temperature sensor of the present invention and includes a pyroelectric sheet that is coated on its lower surface with a conductive layer.

A preferred embodiment of the two-dimensional, electrostatic heat sensor of the present invention is shown at 1 in FIG. 1. The sensor 1 is formed of a thin sheet 2 of uniformly poled, pyroelectric material that is coated on one side with an electrically and thermally conductive layer 3. The sheet 2 is preferably formed from such material as polyvinylidene fluoride, lanthanum-modified lead zirconate-titanate or other such noncrystalline polymer material having pyroelectric properties. Poled, pyroelectric materials exhibit the unique characteristic of developing electrostatic charges on their planar surfaces when subjected to a change in ambient temperature, with the charges developed on one surface opposite in polarity to those developed on the other surface.

Figure 2:
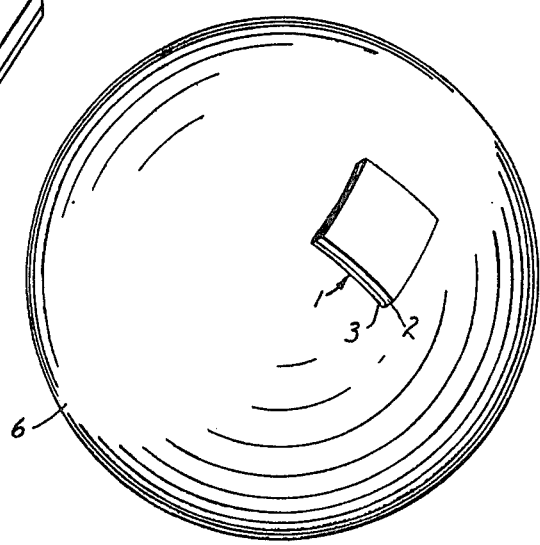
FIG. 2 is a perspective view of the sensor of FIG. 1 attached to a portion of the exterior surface of a sphere.

The sensor 1 is adapted to be utilized by placing the conductive layer 3 in temporary surface-to-surface contact with the planar surface of an object having a thermal gradient that is to be detected and imaged. The sensor 1 is highly compliant and may readily be attached to regular or irregular shaped objects. For example, the sensor 1 is shown in FIG. 2 attached to a portion of the exterior surface of a sphere 6. The sensor 1 may be placed on the sphere 6 by spot tacking with an adhesive or other such temporary attachment means.

The pyroelectric sheet 2 and the conductive layer 3 are thin relative to the size of the sphere 6 to insure that the ambient temperature of the sheet 2 and layer 3 will not act as a heat sink to significantly affect the temperature of the sphere 6. Instead, the surface-to-surface contact between the conductive layer 3 and the sphere 6 causes the temperature of the pyroelectric sheet 2 to be altered in accordance with the thermal gradient of the portion of the sphere 6 contacted by the sensor 1. The temperature variation of the sheet 2 results in electrostatic charges of opposite polarity to be produced on the coated and uncoated surfaces of the sheet 2. Such electrostatic charges are produced in proportion to the pyroelectric coefficient of the sheet 2 and the degree to which the temperature of the sheet 2 was changed by the thermal gradient of the sphere 6. Thus, the thermal gradient of the sphere 6 is evidenced by a variation in the build-up of electrostatic charges on the planar surfaces of the sheet 2. Because the sheet 2 is electrically nonconductive, the accumulated charges on the uncoated surface of the sheet 2 form an electrostatic latent image that accurately reflects the thermal gradient of the portion of the sphere 6 in contact with the sensor 1.

If desired, the latent image on the pyroelectric layer 2 may be developed without removing the sensor 1 from the sphere 6. Development may be performed by electrically grounding the conductive layer 3 to neutralize the coated surface of the sheet 2 and then detecting the electrostatic charge pattern remaining on the uncoated surface of the sheet 2. Such charge pattern may be detected through the use of an electrostatic voltmeter that is connected to a two-dimensional visual read out such as an X-Y recorder, or by the employment of conventional toner powder techniques as described in my copending U.S. application entitled "Method and Medium for Producing Electrostatic Charge Patterns", filed Aug. 6, 1973, and having Ser. No. 385,849.

In most cases, however, it may be difficult or inconvenient to develop the latent image on the sensor 1 while the sensor is attached to the sphere 6. But removal of the sensor 1 from the sphere 6 at this point presents a problem since the sensor 1 will in time return to its original ambient temperature causing the electrostatic latent image to disappear. It is therefore desirable to completely neutralize both surfaces of the sheet 2 to remove the electrostatic charges thereon before separating the sensor 1 from the sphere 6.

The electrostatic charges may be removed from the coated surface of the sheet 2 by electrically grounding the layer 3. The charges on the uncoated surface of the sheet 2 may be removed by sweeping such surface with a grounded Pluton brush or by the use of a grounded alpha particle static eliminator. Neutralizing the surfaces of the sheet 2 places the sheet 2 in the same electrostatic condition it was in before being varied from its original ambient temperature by attachment to the sphere 6. At this point, no electrostatic charges are present on the surfaces of the sheet 2 and the thermal gradient of the sheet 2 corresponds to the gradient of that portion of the sphere 6 contacted by the sensor 1. Once the sensor 1 is removed from the sphere 6, the sheet 2 will return to its original ambient temperature and an accumulation of electrostatic charges on the surfaces of the sheet 2 will result due to such temperature change. An electrostatic latent image of the thermal gradient of the sphere 6 that is opposite in polarity to the previous image will thus be formed on the surfaces of the sheet 2. Subsequently, such latent image may be developed as previously discussed above to provide a permanent image that is readily transferable to plain paper. Both surfaces of the sheet 2 may then be neutralized once again and the sensor 1 is ready to be reused.

Thus, the present invention provides a reusable thermal gradient temperature sensor that is relatively simplistic in construction and operation, but yet provides a rapid means for profiling the thermal gradient of various types of objects.

The sensor 1 is not limited to use with objects having only planar surfaces, but to the contrary may be used on a wide variety of irregular surfaces. However, to employ the sensor 1 for obtaining highly accurate and precise profiles of the thermal gradient of objects having irregular surfaces, the pyroelectric sheet 2 should be formed to compensate for piezoelectrically produced electrostatic charges due to bending. Piezoelectric charges result when a piezoelectric material undergoes certain dimensional changes; such charges will be produced in the sheet 2 because the type of pyroelectric material forming the sheet 2 also has piezoelectric properties. However, the effect of piezoelectrically produced charges can be significantly reduced by forming the pyroelectric sensing medium of the sensor 1 with a relatively stiff midsection so that when the sensing medium is bent, it will bend about such midsection. Such bending action is in accordance with the general principle that bending of a laminate with a relatively stiff middle layer and two approximately equally compliant outer layers will occur about the midsection of the stiffest member of the laminate.

Figure 3:
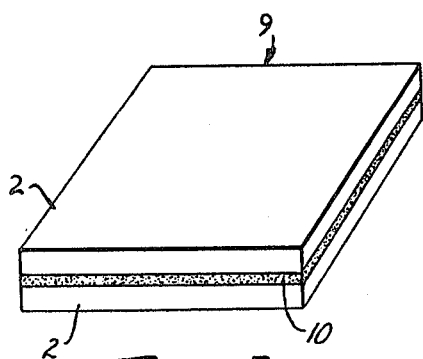
FIG. 3 is a perspective view of a pyroelectric layer that may be substituted for the pyroelectric sheet of the sensor in FIG. 1.
Figure 4:
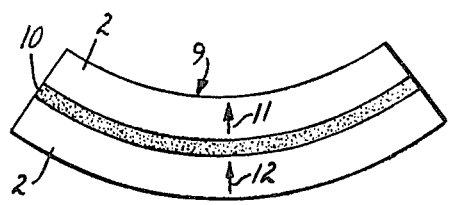
FIG. 4 is an enlarged end view of the pyroelectric layer of FIG. 3 shown in a bent condition.

Referring now to FIG. 3, a laminated, pyroelectric layer 9 that can readily be constructed to provide such bending is shown. The layer 9 is formed by bonding two of the pyroelectric sheets 2 together in surface-to-surface fashion with an electrically insulated bonding layer 10 which, for example, may be an epoxy glue or the like. The bonding layer 10 serves as a relatively stiff midsection about which the two sheets 2 will bend. As indicated by FIG. 4, such bending produces compression of the top sheet 2 and extension of the bottom sheet 2 but the dimensions of the centerline of the midsection layer 10 remains substantially unchanged. As further indicated by the arrows 11 and 12 in the top and bottom sheets 2 respectively, the sheets 2 are poled in the same direction. Thus, compression of the top sheet 2 produces positive and negative charges respectively on the upper and lower surfaces of the top sheet 2, and extension of the lower sheet 2 produces negative and positive charges on the upper and lower surfaces of the bottom sheet 2. The positive charges on the upper surface of the top sheet 2 are approximately equal in magnitude to the positive charges on the lower surface of the lower sheet 2. Accordingly, there is substantially no potential difference between the upper and lower surfaces of the layer 9, which means that the piezoelectrically produced charges will not affect the imaging of the thermal gradient provided by the pyroelectrically produced charges. As a result, substitution of the pyroelectric layer 10 for the single pyroelectric sheet 2 of the sensor 1 furnishes a sensor that provides highly accurate profiles of the thermal gradients of even irregular objects.

What is claimed is:

1. A temperature sensor for placement in thermal contact with an object for providing a detection of the thermal gradient of the object, which sensor comprises:
   a layer of thermally sensitive, compliant, polymeric, poled, electrically nonconductive pyroelectric material comprising two uniformly poled pyroelectric sheets adhesively joined together in surface-to-surface contact to form a relatively stiff midsection in said layer about which the sheets of said layer bend; and
   an electrically and thermally conductive layer carried on not more than one broad surface of said layer for placement in surface-to-surface contact with at least a portion of said object, said pyroelectric layer producing an electrostatic charge pattern on its surfaces which varies in accordance with the thermal gradient of the portion of the object that said conductive layer contacts.

2. A temperature sensor as recited in claim 1 wherein the pyroelectric sheets of said layer are poled in the same direction.

3. The temperature sensor of claim 1 wheren said pyroelectrical material is polyvinylidene fluoride.

4. A process for producing a detectable image of the surface thermal gradient of an object including the steps of:
   (1) providing a temperature sensor that includes at least one poled pyroelectric layer of material that produces opposite electrostatic charges on its broad surfaces when temperature varied, said layer having a conductive layer carried on not more than one of its broad surfaces;
   (2) placing said temperature sensor on said object with the conductive layer of said sensor in surface-to-surface contact with the surface of said object to create an electrostatic charge pattern indicative of the surface thermal gradient of said object on the surface of said pyroelectric layer not carrying a conductive layer thereon; and
   (3) grounding said conductive layer to neutralize any electrostatic charges present on said one side of said pyroelectric layer and produced as a result of the temperature variation of said pyroelectric layer.

5. A process as recited in claim 4 wherein subsequent to grounding said conductive layer, developing the electrostatic charge pattern on other surface of said pyroelectric layer.

6. A process as recited in claim 5 wherein said charge pattern is developed by contacting the other surface of said pyroelectric layer with toner medium.

7. A process as recited in claim 5 wherein said charge pattern is developed by making two dimensional measurements of the electrostatic voltage of said pattern.

8. A process as recited in claim 4 further comprising subsequent to said grounding of said conductive layer, (4) neutralizing said electrostatic charge pattern on said surface of said pyroelectric layer not bearing said conductive layer, and (5) removing said sensor from said object whereby a second electrostatic charge pattern is provided on said surface of said pyroelectric layer not bearing said conductive layer, said second electrostatic charge pattern being opposite in polarity to said first mentioned electrostatic charge pattern.

9. The process of claim 8 further comprising developing said second electrostatic charge pattern.

10. A process as recited in claim 4 wherein said pyroelectric layer is polyvinylidene fluoride.

* * * * *

UNITED STATES PATENT AND TRADEMARK OFFICE
CERTIFICATE OF CORRECTION

PATENT NO. : 4,092,862
DATED : June 6, 1978
INVENTOR(S) : Allen L. Taylor

It is certified that error appears in the above-identified patent and that said Letters Patent are hereby corrected as shown below:

[63] Change May 4, 1976 to -- May 6, 1974 --.

Column 1, line 5, change "May 4, 1976" to -- May 6, 1974 --.

Signed and Sealed this

Thirteenth Day of February 1979

[SEAL]

Attest:

RUTH C. MASON
*Attesting Officer*

DONALD W. BANNER
*Commissioner of Patents and Trademarks*